(12) United States Patent
Kim

(10) Patent No.: US 7,044,117 B2
(45) Date of Patent: May 16, 2006

(54) POSITIVE CRANKCASE VENTILATION SYSTEM

(75) Inventor: Jin Soon Kim, Whasung (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/882,115

(22) Filed: Jun. 30, 2004

(65) Prior Publication Data

US 2005/0103315 A1    May 19, 2005

(30) Foreign Application Priority Data

Nov. 17, 2003  (KR) .................. 10-2003-0081012

(51) Int. Cl.
*F02M 35/00* (2006.01)

(52) U.S. Cl. .................................... 123/572

(58) Field of Classification Search ........ 123/572–574, 123/184.21–184.61

See application file for complete search history.

(56) References Cited

U.S. PATENT DOCUMENTS

| | | | | |
|---|---|---|---|---|
| 3,742,923 A | * | 7/1973 | Oblander et al. | 123/572 |
| 4,630,575 A | * | 12/1986 | Hatamura et al. | 123/184.48 |
| 4,715,329 A | * | 12/1987 | Yasuda et al. | 123/184.49 |
| 4,811,697 A | * | 3/1989 | Kurahashi | 123/184.35 |
| 5,209,191 A | * | 5/1993 | Kopec | 123/184.45 |
| 5,660,155 A | * | 8/1997 | Taue et al. | 123/184.54 |
| 6,009,863 A | * | 1/2000 | Tochizawa | 123/572 |
| 6,095,105 A | * | 8/2000 | Lohr et al. | 123/90.38 |
| 6,190,221 B1 | * | 2/2001 | Nanami | 440/88 R |
| 6,192,848 B1 | * | 2/2001 | Hada et al. | 123/184.24 |
| 6,679,228 B1 | * | 1/2004 | Confer et al. | 123/516 |
| 6,807,957 B1 | * | 10/2004 | Ko | 123/572 |

FOREIGN PATENT DOCUMENTS

JP        2003-120446        4/2003

* cited by examiner

*Primary Examiner*—Marguerite McMahon
(74) *Attorney, Agent, or Firm*—Morgan Lewis & Bockius LLP

(57) ABSTRACT

Blow-by gas supplied from a cylinder head cover is re-supplied to an engine through runners of an intake manifold via a channel portion in communication with a plenum of an intake system.

3 Claims, 4 Drawing Sheets

POSITIVE CRANKCASE VENTILATION SYSTEM

CROSS-REFERENCE TO RELATED APPLICATIONS

This application claims priority of Korean Application No. 10-2003-0081012, filed Nov. 17, 2003, the disclosure of which is incorporated herein by reference.

TECHNICAL FIELD OF THE INVENTION

The present invention generally relates to a positive crankcase ventilation system for an internal combustion engine. More specifically, the positive crankcase ventilation system can reduce harmful effects caused by a lubricant discharged by the internal combustion engine.

BACKGROUND OF THE INVENTION

It is well known that an internal combustion engine is a device that mixes air and fuel in an engine for combustion to generate power. Often, in an internal combustion engine, a small quantity of blow-by gas leaks from a combustion chamber into the crankcase. Thereafter, such blow-by gas is re-supplied to the combustion chamber for re-combustion. The system provided in the engine for re-combustion of such blow-by gas is often called a positive crankcase ventilation (PCV) system.

In a common PCV system, blow-by gas is primarily supplied from the crankcase to a cylinder head through a tube passage formed between the crankcase and the cylinder head. Next, blow-by gas is supplied from the cylinder head to an intake manifold from which it is presented to a combustion chamber through an intake port of a cylinder head for re-combustion.

There usually exist engine lubricant elements, such as lubricating oil, in the blow-by gas. Therefore, if a portion of the blow-by gas path is connected with a rubber connection, the rubber connection is exposed to the lubricant. As a result, the durability of the rubber portion is shortened as the lubricant breaks down the rubber component.

SUMMARY OF THE INVENTION

According to a preferred embodiment, the positive crankcase ventilation system of an internal combustion engine includes a cylinder head cover that covers a cylinder head, an intake manifold including a runner portion that includes a plurality of runners to supply air to said cylinder head, and a plenum that is connected with each runner of the runner portion to supply intake air to the individual runners. Furthermore a channel is connected from the intake manifold to the plenum.

Preferably, the channel part is formed across the runner portion and includes a channel extension portion that is branches from the channel and is connected with a plenum. The channel extension portion is also connected with the bottom of the plenum so that it can substantially approach the central axis of a throttle body. It is preferred that the plenum is located below the runner portion of the intake manifold.

BRIEF DESCRIPTION OF THE DRAWINGS

For better understanding of the nature and objects of the invention, reference should be made to the following detailed description, taken in conjunction with the accompanying drawings, in which.

DETAILED DESCRIPTION OF THE PREFERRED EMBODIMENTS

Figure 1:
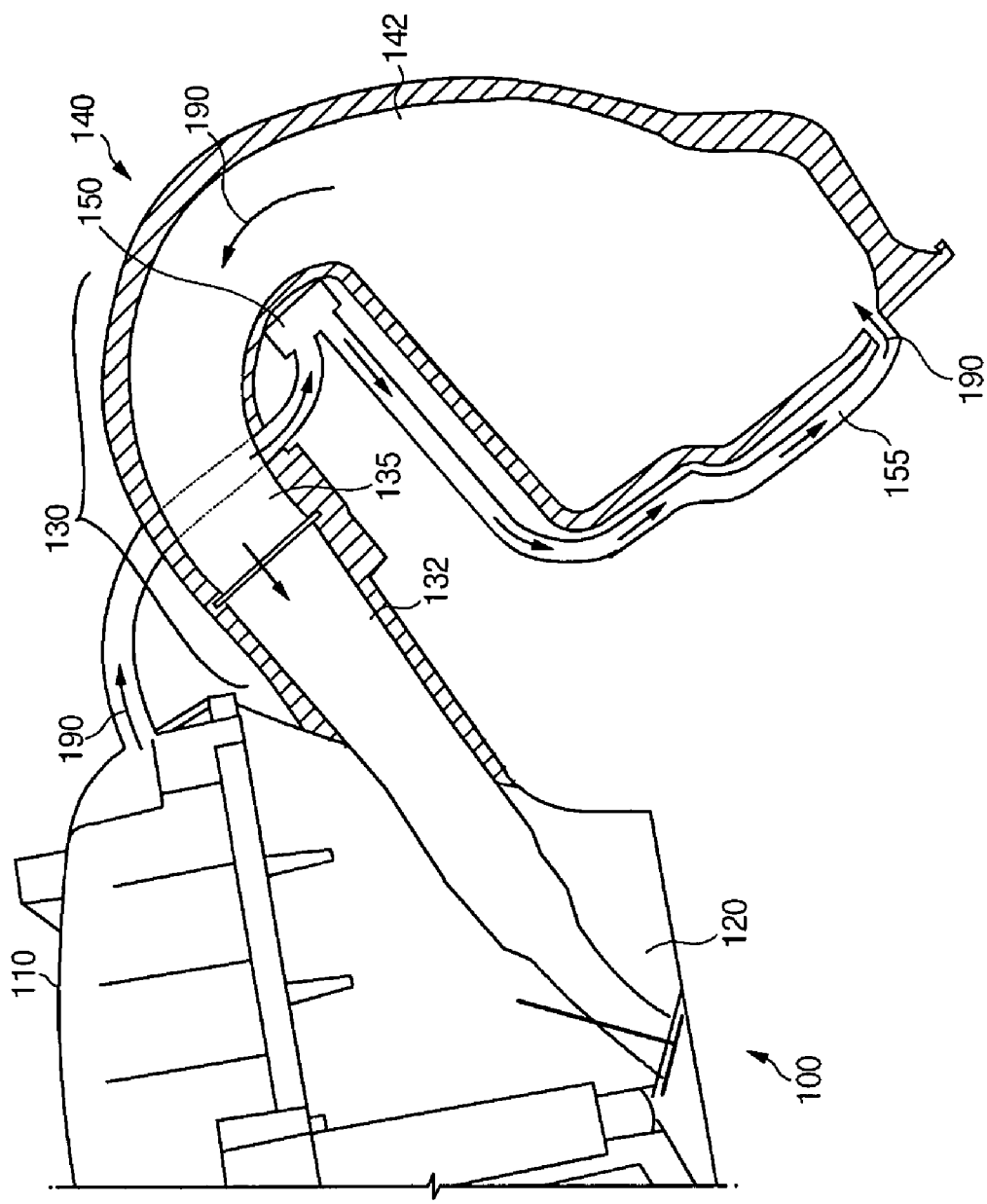
FIG. 1 is a schematic view of a positive crankcase ventilation system of an internal combustion engine according to an embodiment of the present invention.
Figure 2:
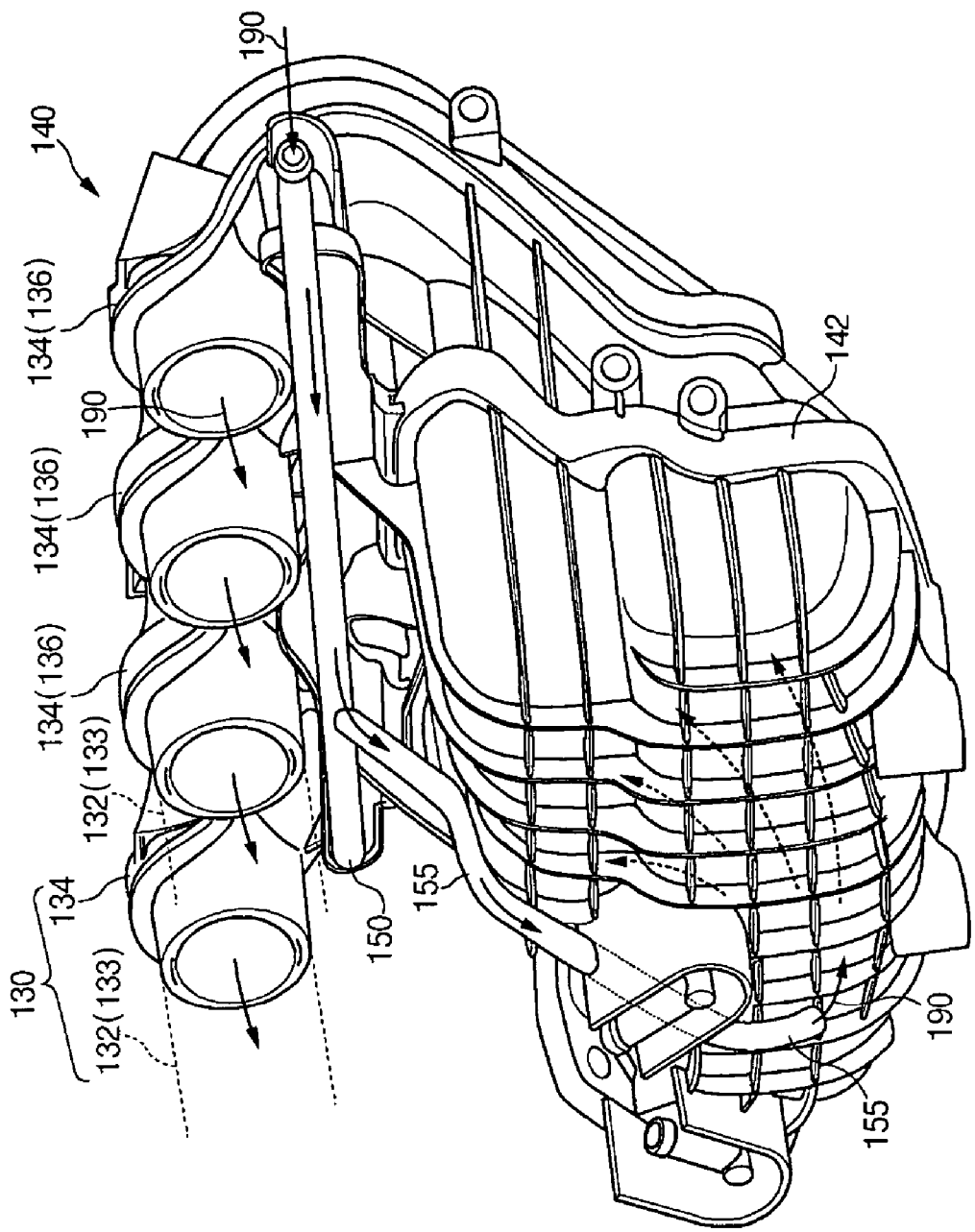
FIG. 2 is a perspective view illustrating an intake manifold of an internal combustion engine according to an embodiment of the present invention.

FIG. 1 is a perspective view of the positive crankcase ventilation system of an internal combustion engine and FIG. 2 illustrates an intake manifold of the internal combustion engine according to an embodiments of the invention. According to FIGS. 1 and 2, the positive crankcase ventilation system includes; a cylinder head cover 110 that covers a cylinder head 120. An intake manifold includes a runner portion 130 that further includes a plurality of runners 132, 134 for supplying air to the cylinder head 120. Aplenum 142 is connected with each runner 130, 132, 134 of the runner portion 130 to supply intake air to the runner part. A channel 150, 155 is connected from the intake manifold 140 to the plenum 142.

Each runner 130, 132, 134 is protrudingly formed on the plenum 142, which comprises a main body of the intake manifold. Each runner 134 of the main runner 136 is connected with each runner 132 of the stub manifold 133 formed on the cylinder head 120 of the engine 100. In other words, each runner 134 of the main runner 136 is connected with the runner 132 of the stub manifold 133 form the runner portion 130, 132, 134 of the engine 100. Therefore, the term of the runner portion used in the description of this specification and the claims must be interpreted to commonly designate the runner 134 of the main runner portion 136 or runners 132 of the stub manifold 133, and understood not to include the plenum 142.

According to FIG. 1, the plenum is located generally below the runner part of the intake manifold. A channel 150 is connected from the intake manifold to the plenum 142. The channel 150 is connected with the bottom of the plenum 142 such that it can approach a central axis of a throttle body through a channel extension part 155. Additionally, in FIGS. 3 and 4, the channel includes a channel extension portion that is formed across runners 134, 136, branched from a portion of the channel part and connected with the plenum 142. Therefore, blow-by gas 190 from the cylinder head 120 is supplied to the plenum 142 through the channel extension portion 155 via the channel 150.

Figure 3:
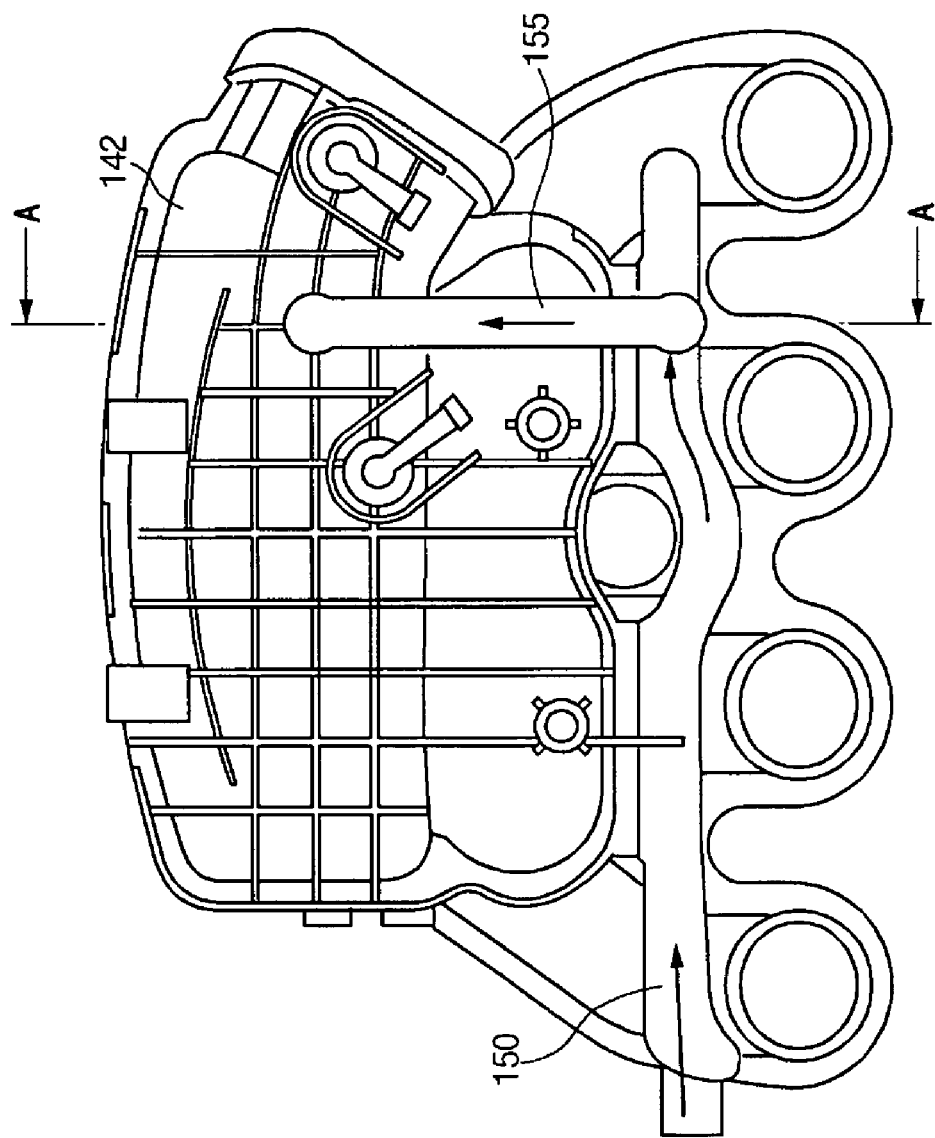
FIG. 3 is perspective view illustrating an intake manifold of an internal combustion engine according to another embodiment of the present invention.
Figure 4:
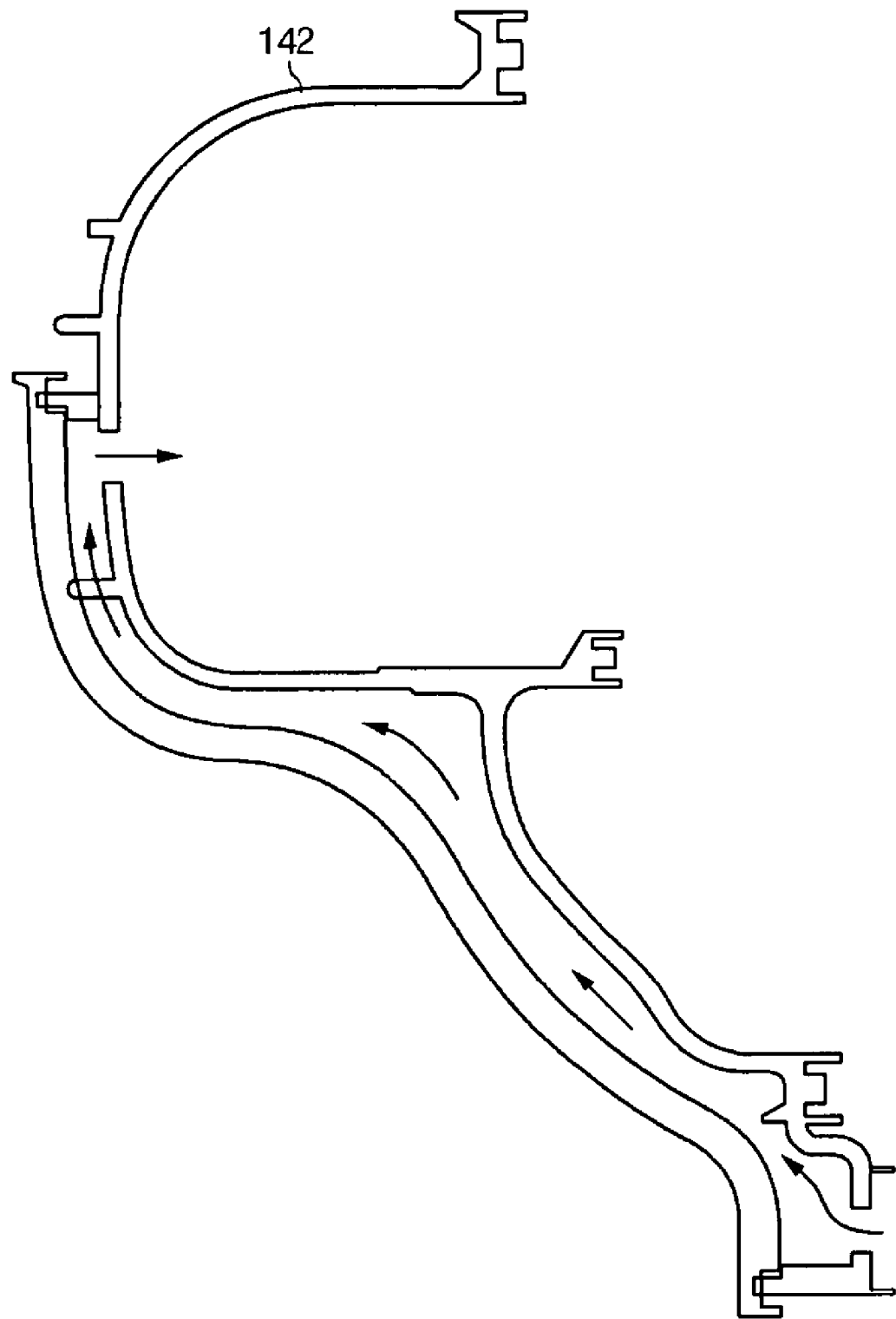
FIG. 4 is a cross-sectional view of FIG. 3 taken along line A—A.

While the channel 150 is integrally formed with the runner portion, as shown in FIGS. 3 and 4, the channel is separated from the intake manifold and can be independently disposed as illustrated in FIGS. 1 and 2.

The blow-by gas 190 that has been supplied to the plenum 142 is mixed with intake air in the plenum 142 and then supplied to the combustion chamber of the engine 100 through the intake part of the cylinder head 120 via each of the runners 130, 134, 132. In other words, blow-by gas 190 is supplied to the runners 130, 134, 132 via the plenum 142. However, the air flow velocity within the plenum 142 typically will be slower than that in the runners 130, 134, 132. Therefore, as the blow-by gas 190 is supplied to the runners 134, 132, lubricant contained in the blow-by gas 190 may separate and sink to the bottom of the plenum 142. Therefore, rubber portions that connect the plenum 142 to the cylinder head 190 come in minimal contact with the lubricant contained in the blow-by gas 190.

While preferred embodiments of the invention have been described above, the present invention is not to be limited to the above mentioned embodiments but includes all the modifications and alterations that may be appreciated by one of ordinary skill in the art and fall within the scope of the appended claims.

According to the embodiments of the present invention, durability of the rubber portions that connect areas of a plenum to a cylinder head in the intake system of an engine can be improved. Additionally, the plenum is located below the top end of a runner portion so the effect of preventing such lubricant influx is improved.

What is claimed is:

1. A positive crankcase ventilation system of an internal combustion engine, comprising:
   a cylinder head cover that covers a cylinder head;
   an intake manifold including a runner portion that includes a plurality of runners to supply air to said cylinder head;
   a plenum connected with each runner of said runner part to supply intake air to said runner portion;
   a channel formed across said runner portion and connected from said intake manifold to said plenum; and
   a channel extension portion branched from said channel and connected with said plenum.

2. The positive crankcase ventilation system according to claim 1, wherein said channel extension portion is connected with a bottom of said plenum so that it can substantially approach a central axis of a throttle body.

3. A positive crankcase ventilation system of an internal combustion engine comprising:
   a cylinder head cover that covers a cylinder head;
   an intake manifold assembly of an internal combustion engine including a runner portion that includes a plurality of runners for supplying air to said cylinder;
   a plenum that is connected with each of said runners to supply intake air to each of said runners, and
   a channel formed across said runner portion that is connected from said intake manifold assembly to said plenum, the channel entering a bottom portion of the plenum; and
   a channel extension portion branched from said channel part and connected with the plenum.

* * * * *